(12) United States Patent
Chandrasekharapuram et al.

(10) Patent No.: US 9,229,845 B1
(45) Date of Patent: Jan. 5, 2016

(54) TESTING USING PRODUCTION DATA IN SCALABLE PRE-PRODUCTION ENVIRONMENTS

(71) Applicant: Amazon Technologies, Inc., Reno, NV (US)

(72) Inventors: Ramakrishnan Hariharan Chandrasekharapuram, Seattle, WA (US); Carlos Alejandro Arguelles, Shoreline, WA (US)

(73) Assignee: Amazon Technologies, Inc., Reno, NV (US)

( * ) Notice: Subject to any disclaimer, the term of this patent is extended or adjusted under 35 U.S.C. 154(b) by 362 days.

(21) Appl. No.: 13/666,832

(22) Filed: Nov. 1, 2012

(51) Int. Cl.
*G06F 11/36* (2006.01)
(52) U.S. Cl.
CPC ........ *G06F 11/3672* (2013.01); *G06F 11/3668* (2013.01); *G06F 2201/865* (2013.01)
(58) Field of Classification Search
CPC . G06F 11/008; G06F 11/3668; G06F 11/368; G06F 11/3692; G06F 11/3688; G06F 11/36; G06F 11/3604; G06F 11/3648; G06F 2201/865
USPC .................................................. 714/37, 38.1
See application file for complete search history.

(56) References Cited

U.S. PATENT DOCUMENTS

| | | | | |
|---|---|---|---|---|
| 5,218,605 A | * | 6/1993 | Low et al. ........................ | 714/45 |
| 5,651,111 A | * | 7/1997 | McKeeman et al. ......... | 714/38.1 |
| 6,195,765 B1 | * | 2/2001 | Kislanko et al. ............. | 714/38.1 |
| 7,412,349 B2 | * | 8/2008 | Moser et al. .................. | 702/182 |
| 7,490,319 B2 | * | 2/2009 | Blackwell ........... | G06F 11/3664 717/124 |
| 8,386,852 B2 | * | 2/2013 | Cohen ................. | G06F 11/3688 714/33 |
| 8,683,440 B2 | * | 3/2014 | Pasternak ...................... | 717/124 |
| 9,081,899 B2 | * | 7/2015 | Ahmed ............... | G06F 11/3664 1/1 |
| 2006/0212540 A1 | * | 9/2006 | Chon et al. .................... | 709/218 |
| 2006/0276997 A1 | * | 12/2006 | Drees ........................... | 702/182 |
| 2010/0138811 A1 | * | 6/2010 | Jayaraman et al. .......... | 717/125 |
| 2013/0111444 A1 | * | 5/2013 | Jones .................. | G06F 11/3672 717/124 |

OTHER PUBLICATIONS

Dean, Jeffrey and Sanjay Ghemawat. "MapReduce: Simplified Data Processing on Large Clusters." [online]. 2004 [retrieved on Dec. 7, 2012]. Retrieved from the Internet: <URL: http://fastandfuriousdecisiontree.googlecode.com/svn-history/r474/trunk/DIVERS/mapReduceByGoogle.pdf>.

\* cited by examiner

*Primary Examiner* — Joseph Schell
(74) *Attorney, Agent, or Firm* — Robert C. Kowert; Meyertons, Hood, Kivlin, Kowert & Goetzel, P.C.

(57) ABSTRACT

Proposed updates to systems are evaluated in a manner that is automated and horizontally scalable. Input to a first system is provided to a second system. The first system and second system process the input and each generates output. The output from the first system and second system is analyzed and differences in the output data between the two systems are identified. Analyzing the output may be performed by a fleet of data processing units and the work of analyzing the output may be performed such that differences in the output data are traceable to subsystems of the second system that caused the differences.

24 Claims, 12 Drawing Sheets dance with at least one embodiment; and

TESTING USING PRODUCTION DATA IN SCALABLE PRE-PRODUCTION ENVIRONMENTS

BACKGROUND

Many modern computer systems, often comprising large numbers of individual computing devices, operate in connection with large amounts of data. For example, organizations that offer goods, services, and other items over the Internet often include systems that interact with thousands or millions of computing devices when providing information about items, taking orders, advertising and performing other activities. These interactions result in data useful for various purposes, including fulfilling orders, accounting, record keeping and performing analysis for various purposes, such as for improving the way items are offered for consumption and detecting errors that need to be corrected.

In addition to operating in connection with large amounts of data, modern computer systems (referred to as production systems) are often quite complex. An organization's infrastructure may comprise multiple subsystems, each of which performs a different role in the organization's activities. For example, an organization may have one subsystem for order processing, another for payment processing, another for inventory tracking, another for information publishing (e.g., through a website or other interface), another for record keeping, another for analysis, and others. Each of these subsystems may itself be quite complex. Further, because of the way different subsystems interact, changes to one (e.g., code updates) can have adverse, even disastrous, effects if not done properly.

BRIEF DESCRIPTION OF THE DRAWINGS

Various embodiments in accordance with the present disclosure will be described with reference to the drawings, in which.

DETAILED DESCRIPTION

Figure 1:
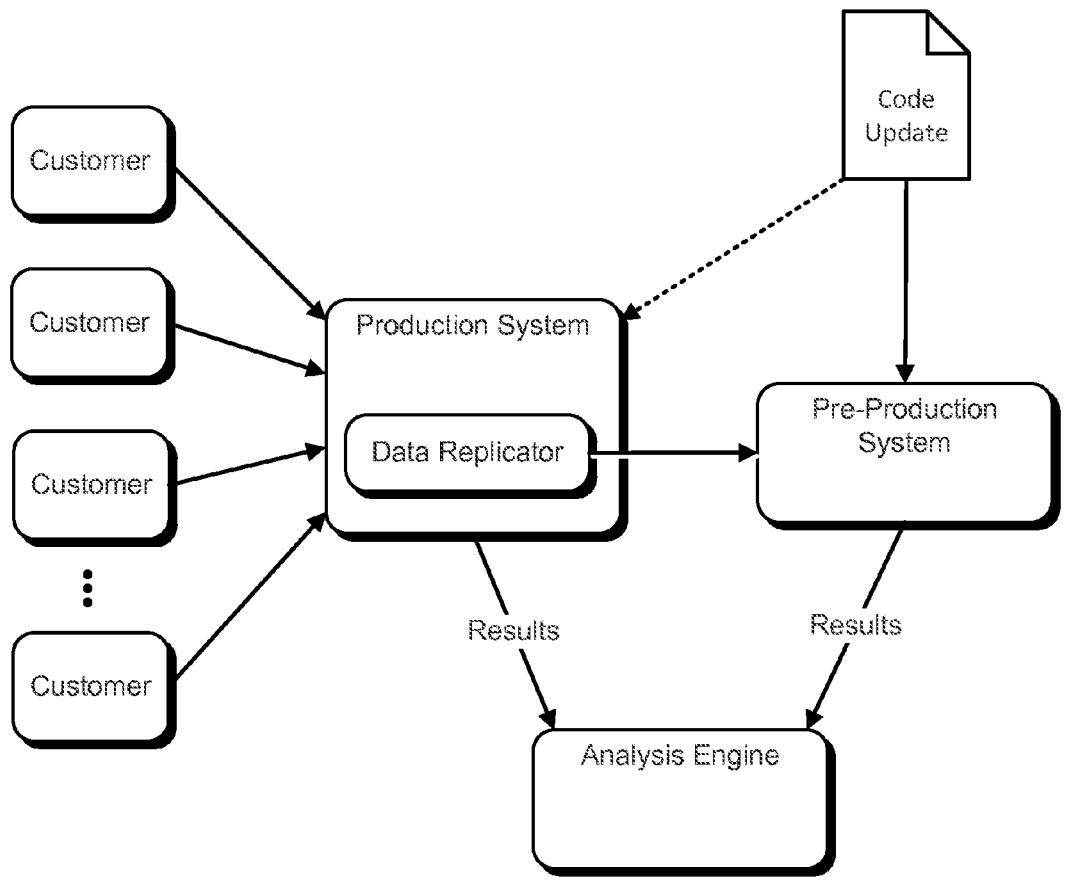
FIG. 1 shows an illustrative diagram illustrating information flow among components in an example environment, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems and methods for scalable testing of large amounts of data. In various embodiments, improved techniques for analyzing system updates (e.g., through code and/or hardware updates) are described. Some embodiments, for example, provide the ability to preview what changes new code would introduce if pushed to production in a continuous and timely manner. It should be noted that, while code updates are used throughout the present disclosure for the purpose of illustration, the techniques described herein are applicable and/or adaptable to other updates, such as hardware updates, system reconfigurations, additions and subtractions of system components and the like.

In an embodiment, a highly scalable architecture for continuous regression testing using production data in a pre-production environment is provided. Systems of the present disclosure are, in various embodiments, horizontally scalable, allowing the processing of large amounts of data. For example, in a big team of developers working across time zones, code changes may be pushed to an organization's system effectively continuously, sometimes 24 hours a day. Horizontal scalability provided by the present disclosure allows systems in accordance with the present disclosure to run effectively continuously, even 24 hours a day in some embodiments, on all production data and hence can provide regular updates on the impact of each code change. Improved architectures in accordance with the present disclosure provide the ability to run tests, such as regression tests, at a per module level of the production system, thereby isolating data quality issues to the modules where they originate. Thus, embodiments of the present disclosure provide mechanisms for continuously reporting detailed statistics about all production data changes and anomalies. Further, embodiments of the present disclosure provide various additional enhancements, such as mechanisms to selectively allow certain previously known anomalies to be ignored. Further, embodiments of the present disclosure provide the ability to perform continuous regression testing on a system to regulate automatic and other code deployments to production systems.

In an embodiment, techniques described and suggested herein include a "pre-production" software system that runs the exact same code that the production system runs but with new code changes pushed to it first. Code changes are pushed to pre-production, validation tests are executed, and when they pass the code changes are pushed to production. By testing and analyzing the output of the pre-production system, the impact of the code change on the production system can be determined. Unlike some conventional systems where the pre-production system does not receive the same input data as the production system, various embodiments of the present disclosure utilize actual data input into the production system, thereby allowing analysis done on the pre-production system to be indicative of how the production system would act in the exact same scenario. Various embodiments also provide technical advantages, such as facilitating analysis on larger data sets, which enables identification of edge cases that have the potential to result in costly production downtime or data loss. In addition, various embodiments described herein provide additional advantages, such as enabling the analysis of amounts of data that are too large for a single test host, that is, for amounts of data that are so large that a single test host would be unable to analyze the data in a reasonable amount of time, if at all.

Various embodiments of the present disclosure also allow other technical advantages, such as enhanced isolation of problem sources. For instance, as noted, a complicated production software system is made up of a number of different subsystems, each having application components that often feed data to each other. In such a scenario, a bad code change in one module may result in cascading data quality issues in modules that feed from it. This makes it difficult to identify the original source of the problem in a timely fashion, sometimes causing a delay of hours or days to identify the source of a data quality issue. Some embodiments, however, facilitate problem source isolation through modularization of various components.

FIG. 1 shows an illustrative example of a simplified environment 100 in which various embodiments of the present disclosure may be practiced. As illustrated in FIG. 1, various customer systems (e.g., personal computers, notebook computers, mobile communication devices, table computing devices, electronic book readers and/or other devices), each labeled as "Customer," interact with a production system. Customers may interact with the production system in various ways. For example, the production system may be an environment of subsystems operating collectively to implement an electronic marketplace where items are offered for consumption. Users of the customer devices may provide user input for interacting with an interface provided by the production system (e.g., a web page or application interface executing on the user device) for the purpose of obtaining information about various items offered and consuming the items, such as by ordering goods and services. Such interactions may result in data input into the production system. The data may include, for example, data representative of how the users used an interface, which pages of a web site were visited by the users, information for which items was obtained by the users, which items were consumed, and/or other information. The production system may include various subsystems that produce data representative of such interaction. Example subsystems include ordering subsystems, advertising subsystems, inventory tracking subsystems, payment processing subsystems, shipping subsystems, user activity tracking subsystems (e.g. systems that generate clickstream data representing how customers interacted with the subsystems, and/or other subsystems used in connection with operations of the production system). It should be noted that, while an electronic marketplace implemented by a production system is used for the purpose of illustration, any system that produces, by receipt and/or its own generation, data may be used in accordance with the various embodiments described herein.

As illustrated, the production system in FIG. 1 includes a data replicator. The Data replicator may be a subsystem of the production system that obtains and provides some or all data received by the production system as input to the pre-production system. For example, as a customer interacts with the production system, the customer may make various requests of the production system, such as requests for pages of a website, requests for data from a database, and/or requests to process orders. Thus, a customer's interaction results in data being input to the production system for processing. The data replicator may obtain data in various ways from the production system. For example, the production system may be configured to provide a copy of some or all data it receives to the data replicator. As another example, the data replicator may query various data stores of the production system to obtain data.

As shown, the data replicator provides data to a pre-production system. The pre-production system may be a system (e.g., environment of subsystems) that is configured the same as or similar to some or all of the production system. For example, the pre-production system may include some or all of the same subsystems of the production system. In some embodiments, the pre-production system is a copy of the production system or copy of a subset of the production system's subsystems. In other embodiments, the pre-production system is a modified copy of the production system or a subset of the production system's subsystems. For example, to accommodate the amount of customer interaction with the production system, the production system may include clusters of servers (e.g., web servers and/or application servers) that each perform the same or similar role. A production system may, for example, occupy multiple data centers in multiple geographic regions in order to handle customer traffic. Depending on the size of the production system, it may be impractical to copy the complete production system. Accordingly, the pre-production system may include smaller clusters (and/or even single server instances instead of clusters) and other modifications that enable the pre-production system to be implemented using fewer computing resources than the production system.

Data from the data replicator is used to play back events in the pre-production system. For example, if a customer requested a web page, the request may be played back to the pre-production system by making the same request. Similarly, if the customer submits an order, the submission may be made to the pre-production system. The timing of the various inputs to the pre-production may also be the same as recorded by the production system. For example, if two customer interactions were a certain amount apart, that amount of time may be used to play back appropriate input to the pre-production system.

As shown in FIG. 1, both the production system and pre-production system process customer input. As a result of such processing, both the production system and the pre-production system produce results. For example, if a customer submits an order, various subsystems of the production system produce data accordingly, such as records of the order, historical statistics, clickstream data recording customer interactions with the production system (or virtual customer interactions with the pre-production system) leading to the order, and/or other relevant information. The results from each of the production system and pre-production system are then provided to an analysis engine. The analysis engine may be a system that analyzes data from both the production system and pre-production system and provides results to a user of the analysis engine through a user interface. The analysis engine may, for instance, analyze data from both the production system and pre-production system to determine differences between the output of both systems. Determining differences in the output may identify, for example, errors in the pre-production system due to incorrect code updates. As an example, the production system may be configured to produce price data using simply numbers. A code change to the pre-production system may have caused one subsystem to append a dollar sign to price values. Such a change may affect other systems which depend on price data from the subsystem, such as by causing errors in subsystems that are not configured to recognize that the dollar sign should be dropped.

As illustrated in FIG. 1 and as noted above, code updates may be pushed to the pre-production system so that the analysis engine can compare the output of both the pre-production system and the production system to determine any effects of the code updates. As illustrated by the dotted line, if analysis from the analysis engine indicates that the code update did not cause any significant issues, the code update may then be pushed to the production system. The analysis engine can also compare the outputs from the production system and pre-production system to determine if the code update had any adverse effect on the production system, perhaps due to differences between the production system and pre-production system, discussed above.

Figure 2:
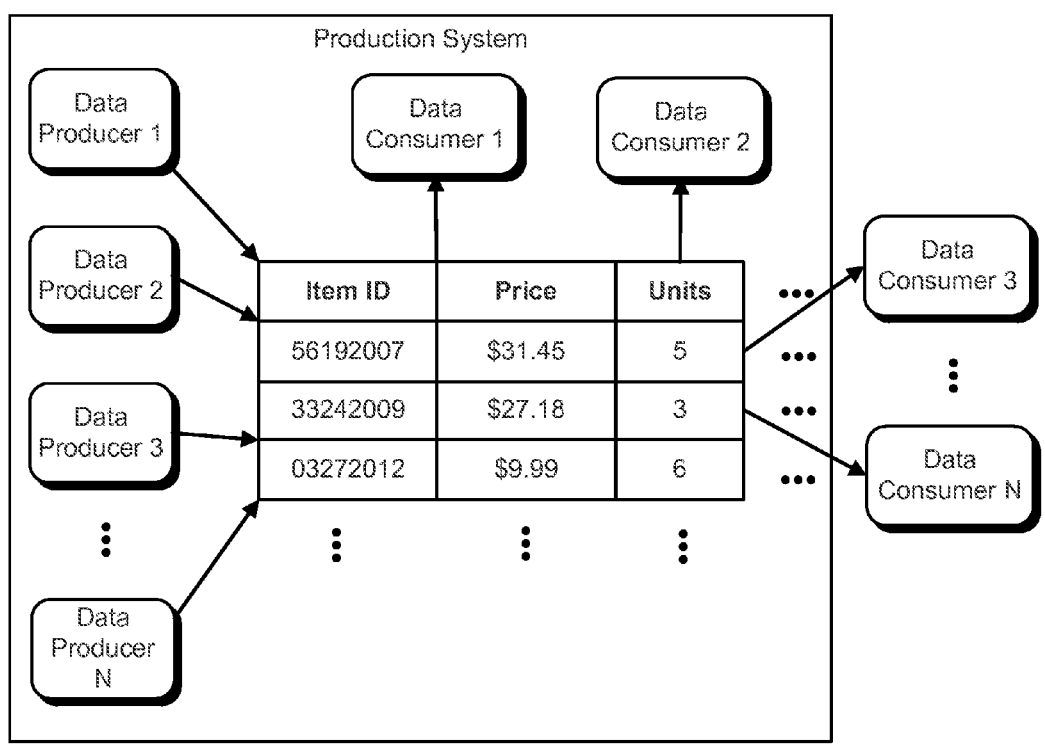
FIG. 2 shows an illustrative diagram of a production environment, in accordance with at least one embodiment.

FIG. 2 shows a diagrammatic representation of example data flow in a production system. As illustrated, a production system includes one or more data producers. Each data producer may be a subsystem of the production system. A data producer may be, for example, a subsystem of the production system that receives input from a customer and/or another subsystem of the production system, processes the received data, and provides output data. As illustrated by FIG. 2, the data producers produce data that may be aggregated. In this example, data is aggregated into a tabular schema, although other ways of aggregating data may be used. As illustrated, a table associates identifiers of items offered for consumption by the production system with various attributes about the item that are determined by the data producers. A row in the table has entries corresponding to values of the corresponding attributes, where each column has a corresponding attribute. As illustrated, price and units sold (e.g., to a particular customer who may have a corresponding identifier in another entry) are in the table as are other attributes. Each data producer may provide values for one or more entries in one or more rows and values for entries in a row may be collectively populated by multiple data producers. For example, for an item, one set of values may be provided for the item's row while another set of attributes may be provided by another data producer for the item's row. The sets of attributes may be disjoint or have a nonempty intersection. The particular data provided by a data producer may depend from its role in the production system. In addition, some data producers may have the same role (e.g., for the purpose of scalability). For instance, to provide scalability, the values of some attributes may be provided by one data producer for one set of rows and values for the same attributes may be provided by another data producer for another set of rows. The sets of rows may be disjoint or may have a nonempty intersection. When a nonempty intersection for sets of attributes and/or sets of rows exists, aggregation may include processing data to remove duplicate values. While illustrated as components of the production system, it should be noted that one or more data producers may be separate from the production system. A production system may, for example, provide data from third party systems.

As illustrated, the environment illustrated in FIG. 2 includes one or more data consumers. A data consumer may be a computer system that obtains aggregated data for processing for a corresponding purpose. As illustrated, data consumers may be part of the production system or separate from the production system, although data consumers may be all components of the production system or all separate from the production system. Data consumers may have various roles. A data consumer may, for instance, analyze data for the purpose of improving advertisement targeting methods, for performing financial analysis or for performing performance analysis. A data consumer may also, with or without analysis, consume data for the purpose of archival storage or storage for other purposes. Generally, a data consumer may be any system that consumes data for any particular purpose. Further, while not illustrated as such, a data consumer may itself be a data producer. For example, a data consumer may obtain data from the table and/or another data producer and provide data that is used to populate the table and/or to provide data to other data consumers.

As illustrated in FIG. 2, code updates to any of the data producers can have a significant effect on the data that is consumed. For example, errors produced by one data producer may affect the results of numerous data consumers. Similarly, because the data from the data producers is aggregated, it can be difficult to isolate which of the data producers is providing erroneous data, especially if multiple code updates are pushed to different data producers in a relatively short amount of time. Techniques of the present disclosure, as discussed below, provide enhanced abilities to isolate and repair the source of erroneous data.

As noted, various embodiments of the present disclosure utilize a data replicator in connection with a production system. A data replicator may be a computer system that performs a method that pushes production data (i.e., input data to the production system) to the pre-production environment in real time or nearly real time, so that the pre-production environment has the exact same input data as the production environment, at least for a portion of the input to the production environment. A data replicator may provide data in real time by providing the data as soon as received (i.e., as soon as computing resources implementing the data replicator are able to transmit the received data) without any programmed delay, such as a delay caused by hatching of the received data to provide in batches. To enable a data replicator, the production system may include a subsystem that samples and copies production data. Discussed below are two illustrative embodiments of how this may be implemented.

Figure 3:
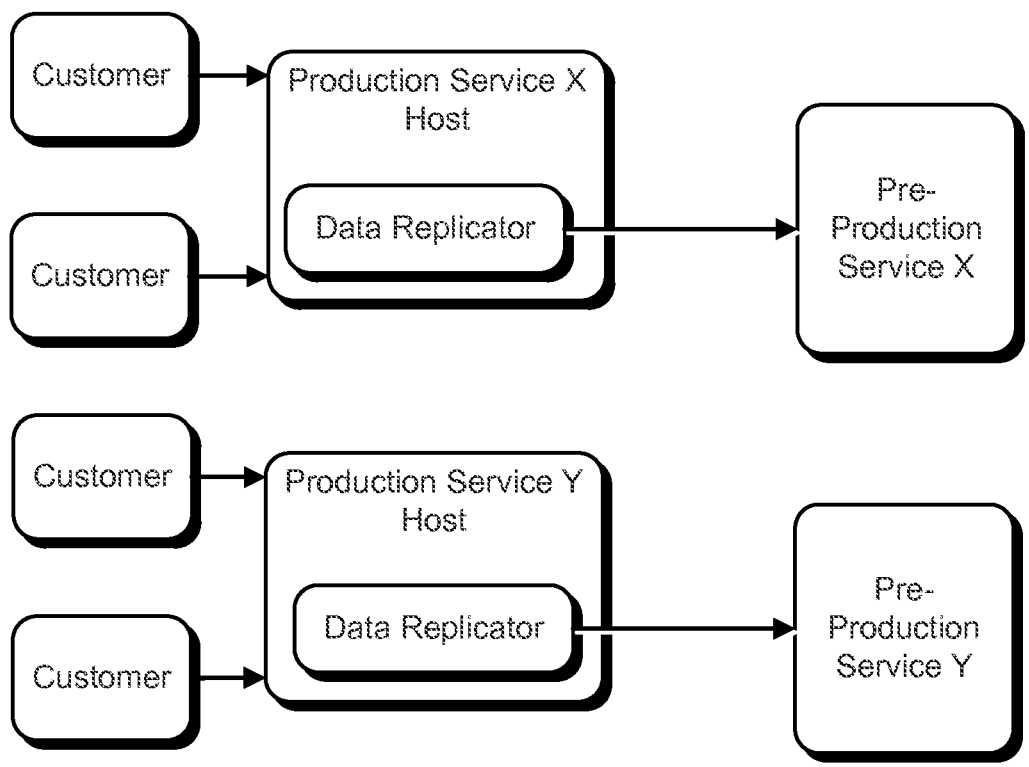
FIG. 3 shows an illustrative diagram illustrating information flow among components in an example environment, in accordance with at least one embodiment.

FIG. 3 shows an illustrative example of an environment in which a data replicator may be implemented, in accordance with various embodiments. As shown in FIG. 3, production hosts of a production system each include a data replicator, such as described above. A production host may be a computing device of the production system. In an embodiment, the data replicator from a corresponding production host sends sampled data directly to a pre-production service. The pre-production service may be a service implemented by a pre-production system to enable data transfer from the data replicator of a production service host to a corresponding production host in the pre-production system. The pre-production service may be implemented by a corresponding pre-production host or another device that provides the received data to the pre-production host. The data may be sampled so as to not overload the pre-production system, such as when the pre-production system is configured to handle loads much smaller than the corresponding production system. This allows the Pre-production service to be processing production data almost in real time (i.e., with a minimal delay). Further, while FIG. 3 shows each pre-production host having its own pre-production service to receive data from a corresponding data replicator, a single service may provide data to multiple or even all pre-production hosts. For example, a pre-production service may receive data and, using programming logic with which it is configured, determine which pre-production host to provide the received data to.

As data is input into the production service host (e.g. from a customer, as illustrated in FIG. 3), the data replicator may send a copy of the data to the corresponding production service host. As noted, the data may be sampled, such as by taking only a percentage of the input that is received. The percentage may be configurable, e.g. by a user of an analysis engine, such as described above. The production service host may provide the received input to the corresponding pre-production service for processing and production of output.

Figure 4:
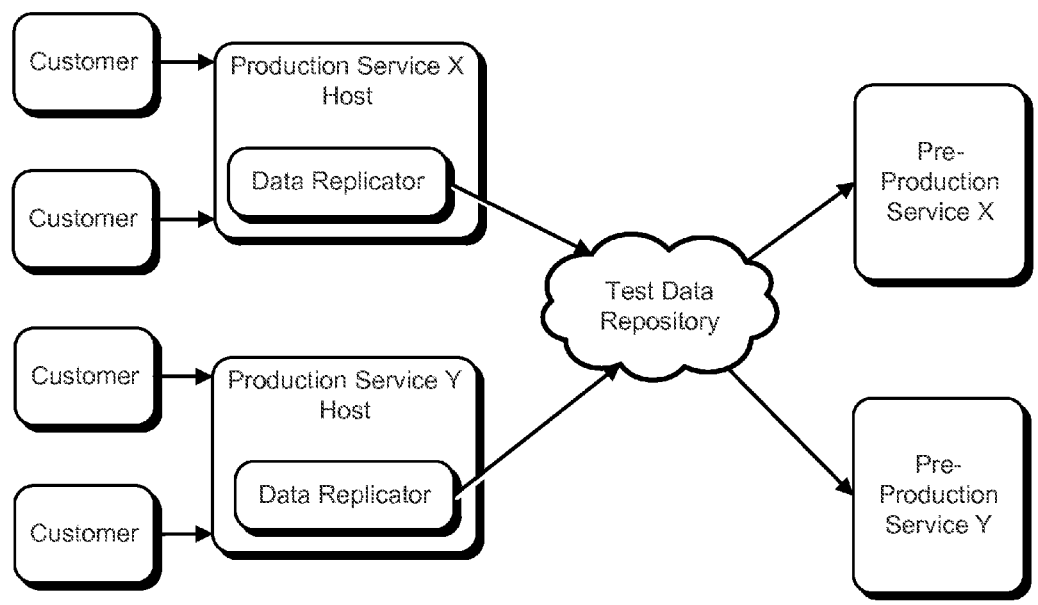
FIG. 4 shows an illustrative diagram illustrating information flow among components in an alternate example environment, in accordance with at least one embodiment.

FIG. 4 shows another environment illustrating another embodiment in which data replicators may be used. As with FIG. 3, the environment illustrated in FIG. 4 includes customers interacting with production hosts, each of which having a data replicator that provides data to pre-production services. Accordingly, variations discussed above in connection with FIG. 3 are also applicable to FIG. 4. In FIG. 4, however, the data replicators write to a network storage system (e.g., a "cloud" storage system), in particular to a component called a test data repository. In an embodiment, the test data repository holds the data for later replays. To enable later replays, instances of input data may be marked with time stamps indicating when the input data was received by the production host. In this manner, the time stamps can be used to replay input events with timing mimicking what actually happened. In this manner, system loads can be accurately replayed in a pre-production system, thereby providing more realistic input and, as a result, higher quality output.

This embodiment, therefore, allows the production service to be fully decoupled from the pre-production service, therefore mitigating against performance impacts caused by replicating data in real time. In this embodiment, however, there may be a delay between the time the production service receives the data and the time the pre-production service receives it. This decoupling, on the other hand, allows the sending of production data to be deprioritized when the production system host is at or near capacity or even overloaded. Since data replicators, in various embodiments, run at a lower priority, it can stop sending the data to the test data repository when under heavy load (or send it as a slower rate), queuing it on disk until the production service comes back to normal traffic.

As noted, it may be impractical (e.g., prohibitively expensive) to replicate the entire production setup in pre-production. Accordingly, in various embodiments, the pre-production system setup is typically only a percentage of the production system and sometimes for certain regions only. In order to decide how much traffic to sample, the data replicator instances on each production host may communicate regularly with a data replicator controller, which may be a network endpoint remote from the host or implemented locally to the host. A data replicator controller may be an application or a device that includes an application that controls sampling levels for data replicators. A data controller may include an interface that allows a user to change sampling levels on demand. The controller may also automatically change sampling levels based on various factors, such as production host loads. The controller may, for example, reduce the sampling rate for a host whose load exceeds a certain threshold, which may be measured in various ways, such as concurrent connections, transactions per time period, central processing unit (CPU) clock cycles, requests per time period and/or in other ways.

Figure 5:
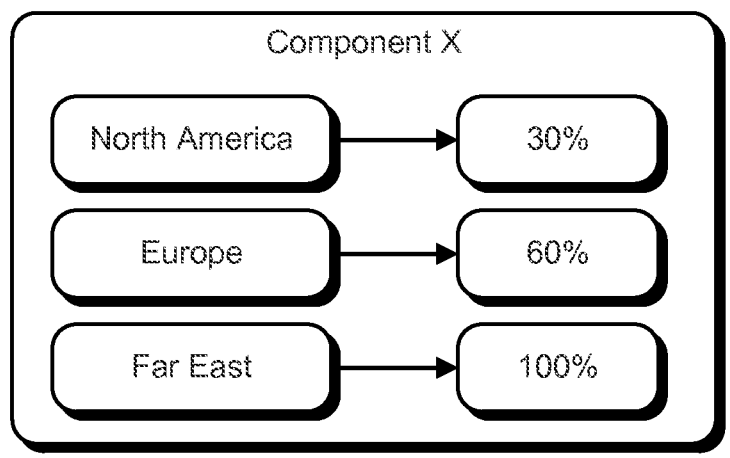
FIG. 5 shows a graphical representation of sampling rate configurations, in accordance with at least one embodiment.
Figure 5:
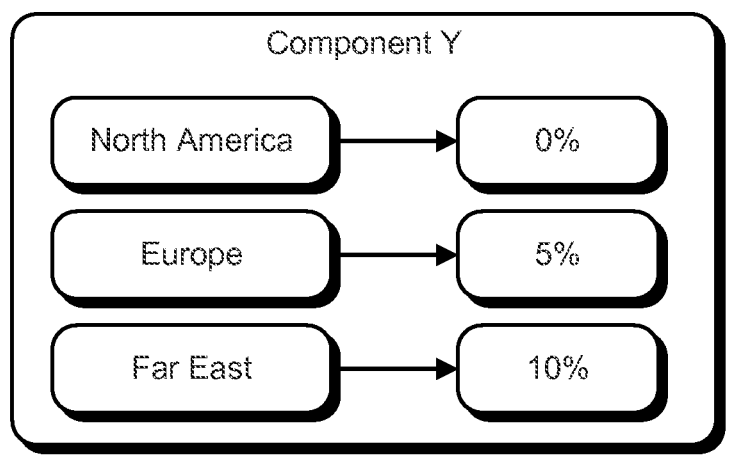

When a controller includes a user interface, a user may navigate to (e.g., cause a user device to request a web page for) a console where he or she can indicate the region and percentages desired as the diagram illustrated in FIG. 5 shows (or any other level of metadata). In this example, component X and component Y have different levels of sampling, and the North American region is turned off completely for component Y. For example, for "Component X," which may be a particular production host, cluster of production hosts, or other logical organization of components of the production system, a version of component X implemented in a North American region is set to sample at 30%. Similarly, the same component in the European region is set to sample at 60% while the version of the component in the Far East region is set to sample at 100%. In this example, an organization may have data centers in North America, Europe and the Far East, each of which operates the Component X. For a different component, illustrated as "Component Y," the sampling for the North American region is set to zero (perhaps because the North. American region is under a particularly heavy load or system constraints), the European region is set to sample at 5% (also, perhaps due to a particularly heavy load or system constraints) and the Far East is set to sample at 10% (perhaps due to the same reasons as discussed above).

As discussed, variations are considered as being within the scope of the present disclosure. For example, to reduce the resources required by the data replicators, data replicators may replicate all input data to the test data repository. The test data repository may include one or more computing devices that sample the data received form the data replicator(s). Sampling may be done as received or at a later time. For instance, the test data repository may store received data from data replicator(s) and select which data to keep and use for use in a pre-production system. In addition, sampling may be performed by both data replicator(s) and systems of the test data repository. For example, one or more data replicators may perform some sampling and one or more other systems may perform further sampling. Generally, any way of sampling data where some or all of the sampling is performed by something other than a data replicator may be used in this alternate embodiment.

Diagrams, such as illustrated in FIG. 5, may appear on the console and the user may select the buttons illustrated in order to specify different percentages. When the controller changes a sampling rate, either in response to user input or automatically, an appropriate signal may be sent to the data replicator which may responsively reconfigure to sample at the new specified rate.

Figure 6:
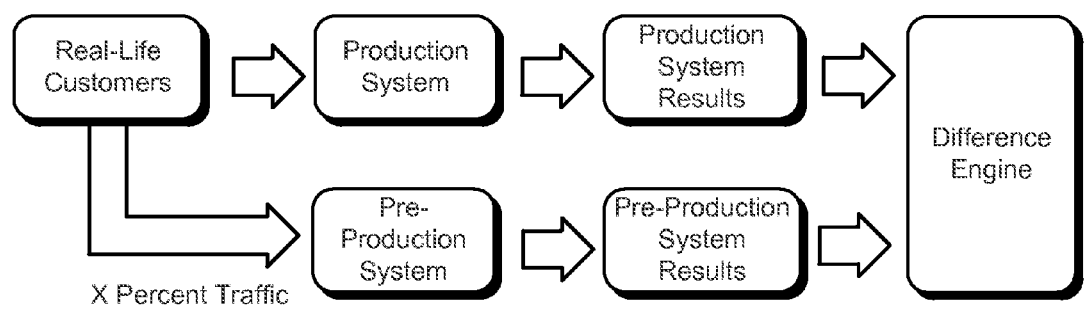
FIG. 6 shows an illustrative diagram of information flow for an environment for analyzing proposed system updates, in accordance with at least one embodiment.

As noted above, various embodiments of the present disclosure perform analysis of data for various purposes, such as to judge the effect of potential code changes to a production system. In some embodiments, analysis is performed by a diffing engine (also referred to as a difference engine), which may be a computer system (e.g., a computing device or collection of computing devices operating collectively) to analyze data. Data to the diffing engine may be results of actual customer input data, as discussed above. For example, as illustrated in FIG. 6, input from customers is sent to both a production system and pre-production system (with possible sampling used to reduce the amount of data to the pre-production system). Data produced as a result of processing by the production and pre-production systems are provided to a difference engine, such as described in more detail below. This provides benefits such as: increased realism in data since data to use for testing purposes is production data and, therefore, reflects exactly the patterns that the production service encounters; and increased data availability since the amount of data available for testing purposes is very large (e.g., terabytes or petabytes), therefore properly exposing edge cases that can result in costly production downtime or data loss.

Figure 7:
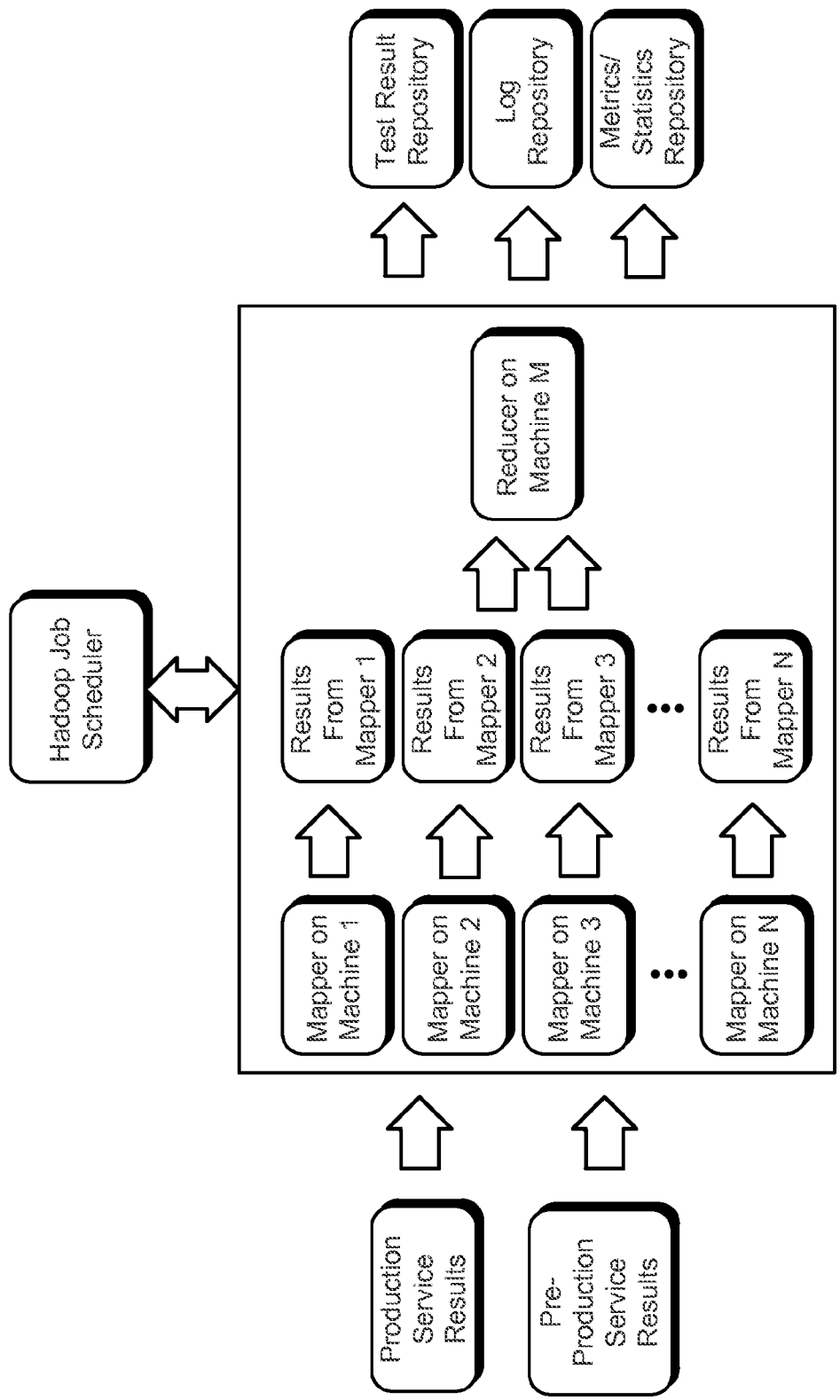
FIG. 7 shows an illustrative example of an environment for analyzing proposed system updates, in accordance with at least one embodiment.

In various embodiments, the amount of data being handled is massive in the sense that most typical computer systems (i.e., computer systems not categorized as super computers) cannot practically process the amount of data in any reasonable amount of time. As a result, as illustrated in FIG. 7, various embodiments of the present disclosure include horizontally scalable systems that can identify differences and anomalies in the data being output by production and pre-production systems. To process a large amount of data, various embodiments make use of a programming model called MapReduce, which runs on a cluster of computers. One suitable example of a framework that implements MapReduce Hadoop developed by the Apache foundation. Using this programming model allows for a scalable architecture that is able to run the programming model continuously.

As often implemented, the MapReduce programming model comprises two steps: a map step and a reduce step. For the map step, data from both the production and pre-production systems is read and split up based on certain criteria. Example criteria would criteria that result in the data being divided equally (e.g., approximately equally) into N parts. These N portions of data are then, in an embodiment, distributed across N different "Mapper" machines, which may be distributed computer system instances, such as virtual machine instances implemented among multiple hosts. In various embodiments, each Mapper machine reads a line of data each from production and pre-production (e.g., a row from a table, such as described above for each of the production and pre-production systems) and identifies any differences between them. If a difference is found by a mapper machine, then it may be kept in memory accessible to the mapper machine. A score of statistics may also be updated whenever a difference is found or a line of data is read. Each mapper step may be referred to as a single test in a suite of regression tests.

For the reduce step, once all the mappers have read and processed their individual pieces of data, the results and statistics from each one of them may get passed (e.g., transmitted over a network) to another machine running the reduce step (which may be referred to as a "reducer"). The reducer combines all the differences and aggregates all the statistics found by each mapper. It then sends out the statistics to a metrics repository, sends the actual differences between production and pre-production data to a log file repository and reports the result of the test to a test result repository.

In various embodiments, the map and reduce steps are controlled by a Hadoop Job Scheduler, which may be a separate computer system which coordinates the operations of the mappers. Custom map and reduce instructions prepared by a test administrator machine may be sent over a network or otherwise to the job scheduler machine. As illustrated in FIG. 7, the job scheduler, in an embodiment, schedules all the mappers, collects results from all the mappers and sends results to the reducer.

Figure 8:
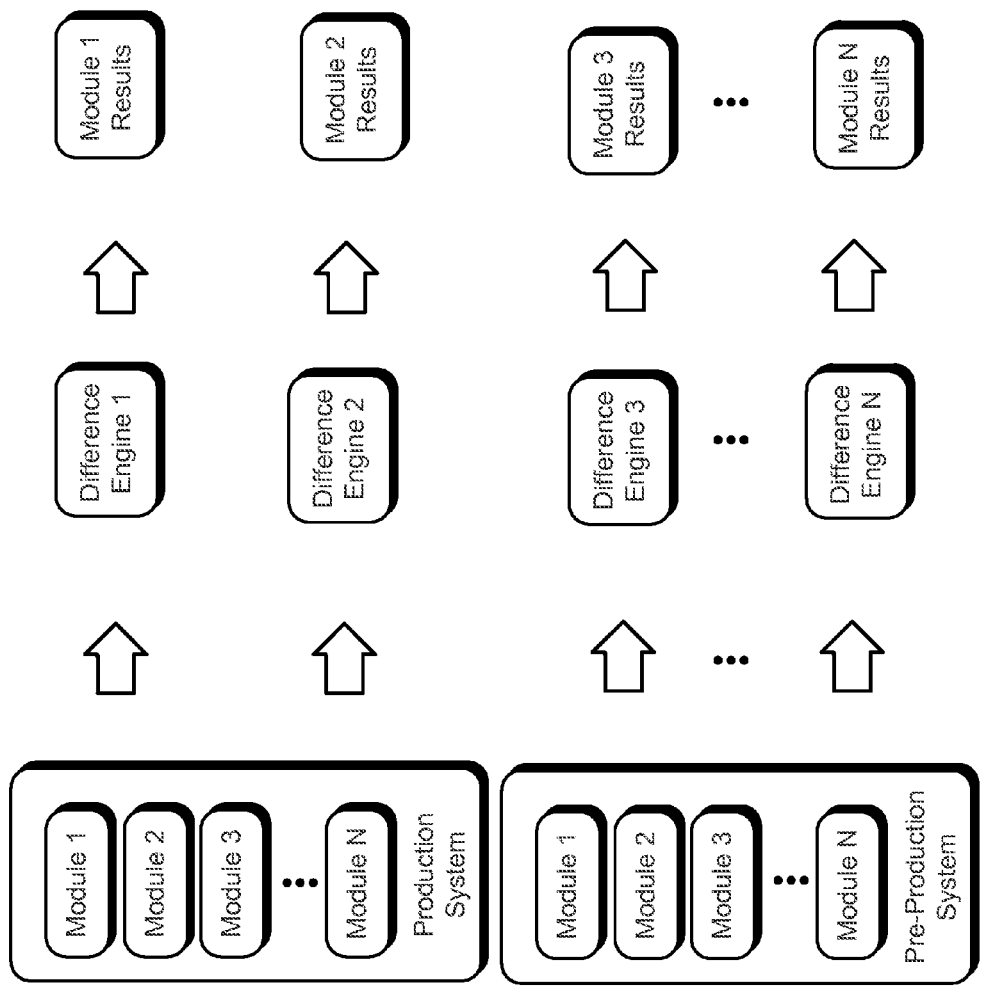
FIG. 8 shows an illustrative example of a diagram representing modularization of a difference engine, in accordance with at least one embodiment.

In some embodiments, the algorithm used by the diffing engine is agnostic to the data that is passed to it. As a result, a technical advantage is achieved in that the production and pre-production data is divisible into module specific data sets which may each be processed by separate diffing engines. As illustrated in FIG. 8, each diffing engine instance may process production and pre-production data from a single module and report results. This way, anomalies and bugs can be tracked down to the exact module that is causing the problem. For example, certain entries in a table, such as described above, may be produced by a subset of data producing machines or even a single data producing machine. By allocating such data to a particular diffing engine instance (or set of instances, e.g., if the size of the data requires it), and by maintaining a map (e.g. relational table) that associates diffing engine instances with data producers, differences found by the particular diffing engine instance can be traced to the data producer that, when operating in the pre-production system, produced data different from what was produced by the corresponding data producer in the production system. As a result, the effects of code updates and other potential changes to the production system can be found and, if necessary, fixed before reconfiguring the production system.

Figure 9:
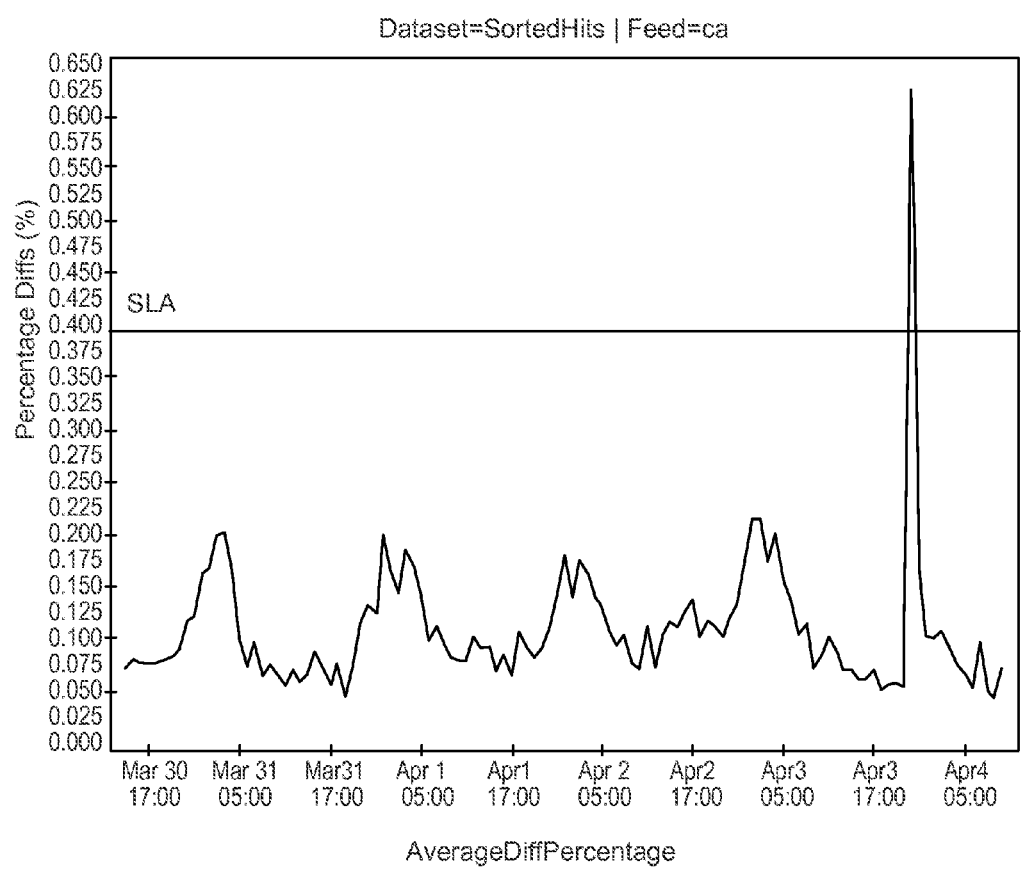
FIG. 9 shows an illustrative example of a report of data analysis, in accordance with at least one embodiment.

As discussed, in an embodiment, the diffing engine applies to a number of services and breaks up the output of the service into records, and subsequently every record is broken up into fields. This allows for further capabilities in the diffing engine. For example, the diffing engine may post metrics on differences (in terms of records different and also in terms of fields different) to a metrics repository, which may be remote. Data in the metrics repository may then be used to provide graphical representations, such as plots on graphs, such as described below. In this manner, in various embodiments, changes may be pushed to a pre-production environment, and within minutes or hours have a visual representation of what fields his or her changes would affect and by how much. FIG. 9, for example, shows an example presentation that is generated based at least in part on analysis from a diffing engine. In this example, a line graph indicates the percentage of records different between production and pre-production systems, which easily shows a spike that is above a value configured to be an acceptable threshold ("SLA"). In this example, an average over all fields or a specified set of fields is illustrated to enable a user to clearly see the effect on a proposed update to a production system that is tested in a pre-production system. For example, as illustrated in FIG. 9, a spike in the line graph appears between the ticks of April 3 and April 4. The spike, in this example, illustrates that the percentage of differences between production output and pre-production output has increased to the amount illustrated, which in this example, is above the SLA.

Figure 10:
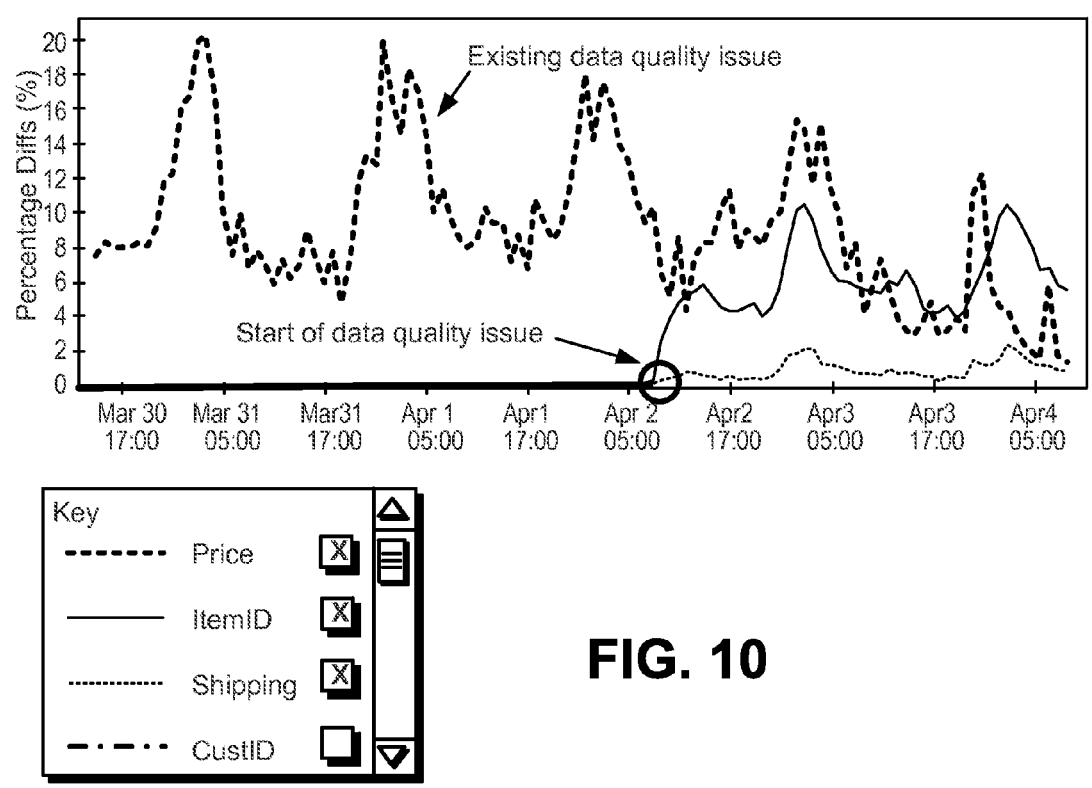
FIG. 10 shows an illustrative example of another report of data analysis, in accordance with at least one embodiment.

As noted above, embodiments of the present disclosure also allow for more granular analysis of the effects of proposed changes to a production system. Since, in some embodiments, the records are broken up into fields, the system also keeps track of which fields are different and posts these to the metrics repository system as well. Service Owners can then graphically identify specific fields that have been affected by proposed system updates. As illustrated in FIG. 10, an existing (ongoing) data quality issue and then a couple of new issues that surface on April $2^{nd}$ are shown. In this example, different fields are visually distinguished from each other. In this example, each field is represented by a different style line, although other distinguishing features may be used, such as shapes representing data points (triangles, circles, x's, squares and/or other shapes), different colors and the like.

In this example, an existing data quality issue is shown throughout the range of the graph, which may be adjustable by user input into a user interface for showing the graph. Other fields do not experience a quality issue until April 2 at about 5:00. In this manner, a user can see that one or more updates pushed to a pre-production system at about this time caused the output of the pre-production system to be different from that of the production system. Thus, the user can identify an update or at least narrow down a set of updates that caused the problem. In addition, because different fields are indicated by the various line types, the user can more easily determine any errors, such as by checking lines of code that affect the affected fields.

As illustrated also in FIG. 10, a key may be provided with the representation of the report data. The key may, as in this example, show which lines correspond to which fields. In addition, in some embodiments, the fields are selectable so that selection of a field causes a corresponding line to appear on the graph. In this example, the fields are selectable by checkboxes on a user interface, although other user interface controls may be used, including non-graphical controls. In this manner, the user can declutter the graphs and focus on particular fields of interest. The user may, for instance, hide the presentation of lines corresponding to known issues to better focus on new issues.

In some embodiments, a snooze feature is utilized so that a user can select one or more fields to be hidden for a predetermined amount of time. In this manner, a user can hide fields temporarily, but a system providing the presentation may, after passage of the predetermined amount of time, cause the hidden fields to present themselves in the presentation once again. In this manner, users are reminded of certain known issues that may require addressing when resources permit.

Numerous other variations are within the scope of the present disclosure. For example, various embodiments of the present disclosure allow for user customizations of various types. For example, in some systems, there may be differences in output values that are, in certain circumstances, insignificant. For example, if a field is currency, a user may specify that floating point numbers should be compared only up to the second digit of precision. Or for a specific string field, as another example, a user may specify that only the first 10 characters should be compared. For a concrete example, corresponding hosts in a production system and a pre-production system may perform calculations of dollar amounts. Some corresponding calculations by the hosts may be identical when rounded to the nearest penny, but may differ with respect to fractions of a penny. If such differences are considered to be insignificant in a given set of circumstances, various embodiments of the present disclosure allow a user to specify that such insignificant differences should not be identified as differences. A user may, for instance, specify that differences have to be at least a certain size before they are identified as differences. Generally, users may attach conditions, which may be complex conditions, on when differences are identified as differences during analysis of production output and pre-production output.

As another example, various embodiments of the present disclosure allow users to specify conditions for differences that are based at least on multiple fields. For example, a user may specify that a difference is identified when differences in multiple specified fields are identified. As an illustrative example, a difference may be identified if, for a particular transaction, both corresponding price values and sales tax values differ between the pre-production system and the production system.

Figure 11:
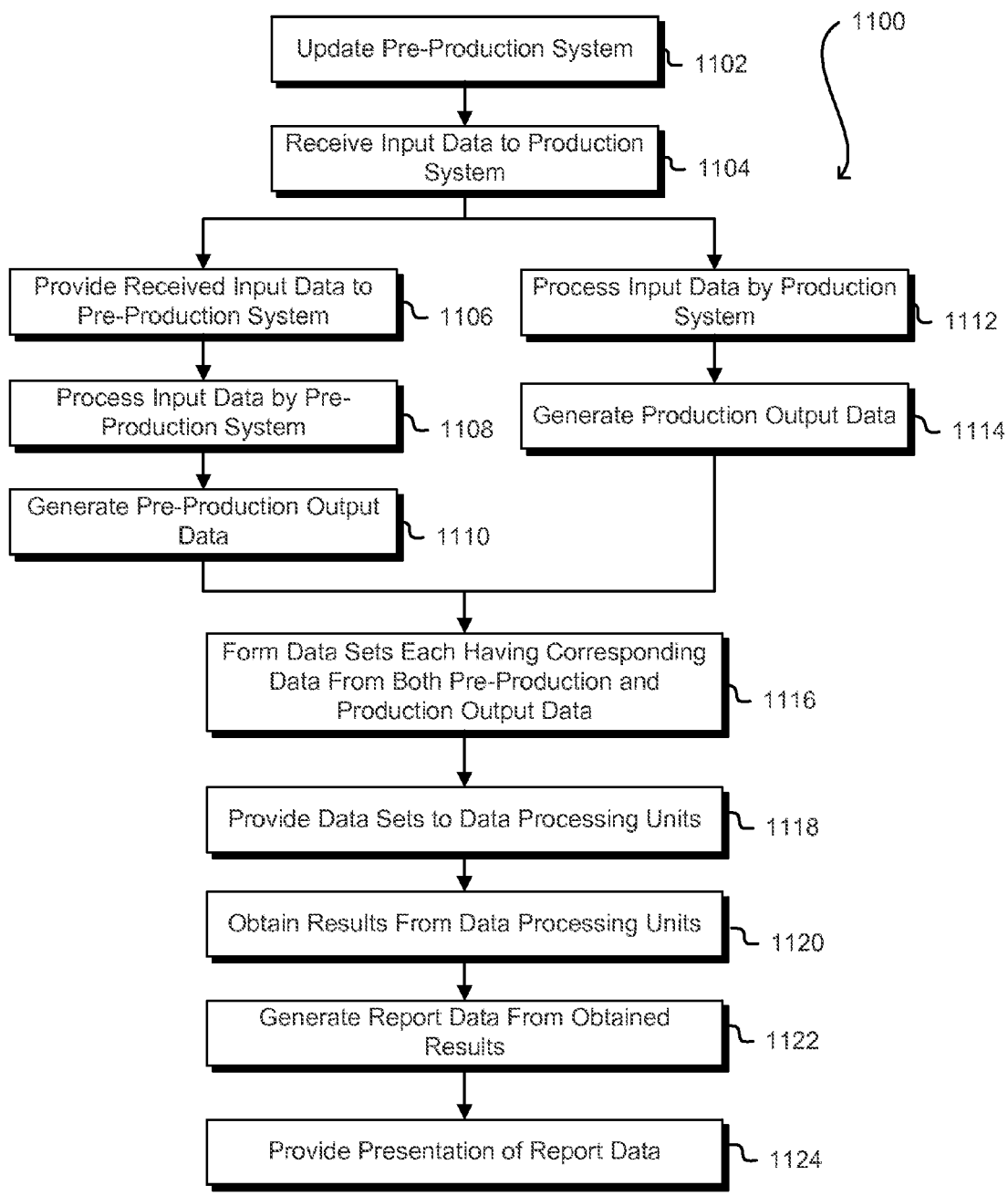
FIG. 11 shows example steps of an illustrative example of a process for evaluating proposed system updates, in accordance with at least one embodiment.

FIG. 11 shows an illustrative example of a process 1100 that may be used to provide presentations of report data generated in accordance with various embodiments described herein. The process 1100 may be performed, for example, by a computing device coordinating the flow of information between components of the environments described above. Some or all of the process 1100 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

As illustrated in FIG. 11, the process 1100 includes updating 1102 a pre-production system such as described above. Updating the pre-production system may be done in any suitable manner. For example, updating the pre-production system may be performed by reconfiguring the pre-production with a hardware, firmware or software update or combinations thereof. Also, as illustrated in FIG. 11, the process 1100 includes receiving 1104 input data to the production system. Data may be received into the production system such as by customers interacting with the pre-production system over one or more networks. For instance, if the pre-production system is used to implement an electronic marketplace, input data may be received for the production system as customers browse the marketplace and engage in transactions. It should be noted that, while illustrated as separate steps in a particular order, the operations of updating 1102 the pre-production system and receiving 1104 input data to the production system may be performed in an order different from that illustrated. For example, a pre-production system may receive data effectively continuously over a period of time and updating 1102 the pre-production system may occur simultaneously with receipt of input data to the production system. Generally, it should be noted that certain operations are illustrated in a particular order and, in many instances, the order may be modified.

Returning to the process 1100, in an embodiment, the received input data is provided 1106 to the pre-production system. Providing the received input data to the pre-production system, as noted above, may include providing all of the production data to the pre-production system or a portion thereof. For example, as discussed, one or more data replicators on one or more hosts of the production system may sample received input data and provide less than all the received input to the pre-production system. In this manner, overloading the reproduction system, which may be a scaled down version of the production system, may be avoided. Accordingly, as illustrated in FIG. 11, the process 1100 includes processing 1108 the input data that was received by the pre-production system and generating 1110 pre-production output data. Processing the input data by the pre-production system may be performed such as by causing the pre-production system to process the input data as if the input data was received from customers themselves or other sources of input.

Also as illustrated in FIG. 11, the data received 1104 into the pre-production system is also processed 1112 by the production system to generate 1114 production output data. In this manner, as illustrated in FIG. 11, at least some of input data received to the production system is processed by both the production system and pre-production system. Such processing may occur simultaneously or at a later time. For example, data may be provided to the pre-production system with a delay and the pre-production system may process the same data as the production system at a later time, such as a few hours later. In an embodiment, the process 1100 includes forming 1116 data sets, each of which has corresponding data from both pre-production and production output data. For example, the pre-production and production output data may include values for various fields related to particular transactions. Data for those fields and for those transactions may be grouped together so that a determination may be made whether the pre-production system and production system, using the same input data, produced the same or different output data. The data sets that were formed may then be provided 1118 to a set of data processing units. The data processing units may be, for example, mappers used in a map producing implementation such as described above. The mappers may then process the data that they have received to determine any differences between output of the production and pre-production systems. It should be noted that, while providing data to data processing units is described for the purpose of illustration, various embodiments may not include providing data to various data processing units. For example, a system performing the process 1100 may itself perform analysis on data.

Returning to the process 1100 illustrated in FIG. 11, Results from the data process units may be obtained 1120. For example, as each data processing unit completes one or more tasks of data processing, the data processing unit may provide results of the processing to a system configured to collect and aggregate results from the data processing unit such as described above. Accordingly, in an embodiment, the process 1100 includes generating 1122 report data from the obtained results. The report data, in an embodiment, includes information that identifies differences between output data of the pre-production and production systems. The report data may also include additional information such as statistical information that was calculated based on the obtained results from the data processing units. Statistical results, for example, may include information such as the percentage of differences found in various fields and/or percentages of differences found among sets of fields and/or all fields. The report data may then be used to provide 1124 one or more presentations of the report data. The presentations may be provided in any suitable manner. For example, example presentations include those illustrated in FIGS. 9 and 10. Presentations need not be, however, line graphs, but may include different types of presentations such as reports that show particular differences in the data which are not necessarily on graphs, but use spreadsheets and/or other presentations.

Figure 12:
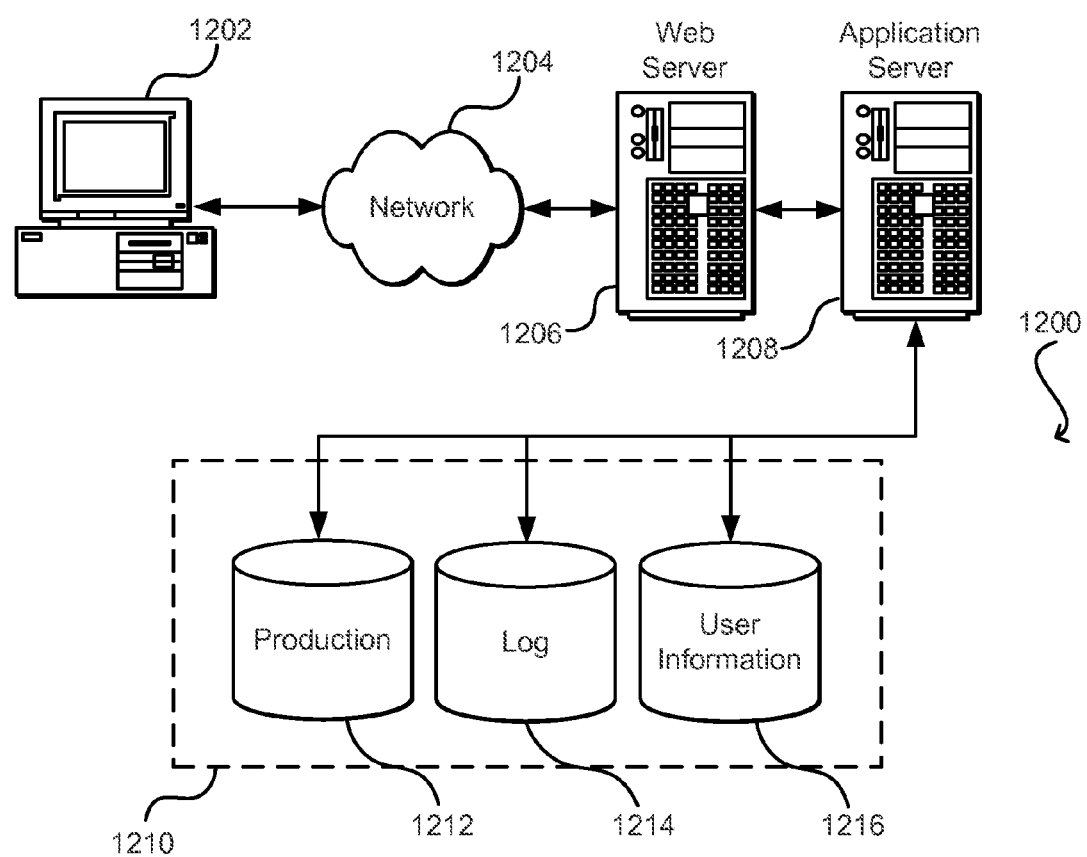
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server (s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for testing proposed system updates, comprising:
under the control of one or more computer systems configured with executable instructions:
for a plurality of first subsystems of a production system:
processing input data received from multiple third-party devices to generate first output data; and
providing a portion of the input data to a corresponding subsystem of a pre-production system, wherein a plurality of second subsystems of a pre-production system are configured to be similar to some or all of the plurality of first subsystems of the production system, and wherein system software of the pre-production system is based at least in part on a proposed update to system software of the production system;
for the plurality of second subsystems of the pre-production system:
receiving, from a corresponding subsystem of the production system, the portion of the input data; and
processing the portion of the input data to generate second output data;
determining differences between the first output data and the second output data that fulfill one or more conditions for being significant differences; and
providing report data that indicates one or more significant differences between the first output data of the production system and the second output data of the pre-production system.

2. The computer-implemented method of claim 1, wherein the system software installed on the production system has been tested, and wherein the pre-production system is installed with system software for testing, wherein the system software for testing comprises the proposed update to the system software installed on the production system.

3. The computer-implemented method of claim 1, wherein the production system is a customer system, wherein the input data is based on customer interactions with the production system, and wherein said processing the input data is performed in real time.

4. The computer-implemented method of claim 1, wherein said providing the portion of the input data to the corresponding subsystem of the second system includes selectively providing less than all input data received from the multiple third-party devices.

5. The computer-implemented method of claim 1, wherein said providing the portion of the input data to the corresponding subsystem of the second system includes:
providing the portion of the input data to a data repository separate from the production system;
accessing the portion of the input data from the data repository; and
providing the portion of the input data from the data repository to the corresponding subsystem of the second system.

6. The computer-implemented method of claim 1, wherein said detecting differences between the first output data and second output data includes:
allocating subsets of the first output data and subsets of the second output data to a plurality of computing devices; and
collecting results from the plurality of computing devices.

7. A computer-implemented method for evaluating proposed system changes, comprising:
under the control of one or more computer systems configured with executable instructions:
receiving, from a plurality of first subsystems of a first system, data received by the plurality of first subsystems as input;
obtaining first output of the first system, wherein at least a portion of the first output is generated based at least in part on the first system processing the input;
using the received data to generate second output in a second system, wherein the second system is configured to include a plurality of second subsystems similar to some or all of the plurality of first subsystems of the first system;
analyzing the first output and the second output to generate report data; and
providing the generated report data.

8. The computer-implemented method of claim 7, wherein: the data received by the plurality of first subsystems as input is transmitted from the plurality of first subsystems to corresponding subsystems of the plurality of second subsystems of the second system; and wherein using the received data to generate the second output includes processing the received data by the corresponding subsystems of plurality of second subsystems of the second system.

9. The computer-implemented method of claim 7, wherein:
the data received by the plurality of first subsystems as input is transmitted from the plurality of first subsystems to a test data repository; and
using the received data to generate the second output includes accessing the data received by the plurality of first subsystems from the test data repository.

10. The computer-implemented method of claim 7, wherein:
analyzing the first output and the second output includes:
allocating corresponding portions of the first output and the second output to a plurality of computing devices; and
collecting analysis results from the plurality of computing devices; and
generating the report data is based at least in part on the collected analysis results.

11. The computer-implemented method of claim 7, wherein the method further comprises:
identifying differences between the first output data and the second output data;
selecting a subset of the plurality of first subsystems based at least in part on which subsystems the identified differences occur in the first output data and second output data.

12. The computer-implemented method of claim 7, wherein the received data received by the plurality of second subsystems as input is a proper subset of a data set received by the plurality of first subsystems as input.

13. A system, comprising:
one or more processors; and
memory including instructions that, when executed by the one or more processors, cause the system to at least:
cause input data to be provided to both a first system and a second system, wherein the input data provided to the second system is a subset of a larger set of input data received by the first system;
obtain first output data from the first system and second output data from the second system, the first output data resulting from the first system processing the input data and the second output data resulting from the second system processing the input data, wherein the second system is installed with an update to system software for the first system;
determine differences between the first output data and the second output data; and
provide report data that is based at least in part on the determined differences.

14. The system of claim 13, wherein:
the first system comprises a plurality of first subsystems;
the second system comprises a plurality of second subsystems corresponding to the plurality of first subsystems; and
said causing the input data to be provided to both the first system and second system includes causing the plurality of first subsystems to provide the input data to corresponding subsystems of the plurality of second subsystems.

15. The system of claim 13, wherein:
the instructions, when executed by the one or more processors, further cause the system to vary the amount of input data provided to the second system relative to the amount of input data in the larger set of input data.

16. The system of claim 13, wherein the first system includes a plurality of first subsystems, wherein the second system includes a plurality of second subsystems, and wherein the plurality of second subsystems of the second system is based on a subset of the plurality of first subsystems.

17. The system of claim 13, wherein:
the first system comprises a plurality of first subsystems;
the second system comprises a plurality of second subsystems corresponding to the plurality of first subsystems;
the instructions, when executed by the one or more processors, further cause the computer system to match determined differences between the first output data and second output data to one or more of the plurality of second subsystems; and
the report data identifies the matched one or more plurality of second subsystems.

18. The system of claim 13, wherein:
the system includes the first system and second system; and
the first system includes a plurality of hosts that provide the input data to corresponding hosts of the second system.

19. One or more non-transitory, computer-readable storage media having stored thereon instructions executable collectively by one or more processors of a computer system to cause the computer system to at least:
obtain first output data from a first system and second output data from a second system, the first output data resulting from the first system processing input data and the second output data resulting from the second system processing the input data, wherein the second system is a scaled version of the first system;
generate reports based at least in part on differences between the first output data and the second output data; and
provide the generated reports.

20. The one or more non-transitory, computer-readable storage media of claim 19, wherein:
the instructions, when executed by the one or more processors, further cause the computer system to control an amount of the input data that is provided to the second system.

21. The one or more non-transitory, computer-readable storage media of claim 20, wherein said causing the computer system to control the amount of data is based at least in part on a load to the first system.

22. The one or more non-transitory, computer-readable storage media of claim 19, wherein the instructions, when executed by the one or more processors, further cause the computer system to receive user input for defining conditions for whether differences between the first output data and second output data are identified as differences; and wherein the report data identifies differences according to the defined conditions.

23. The one or more non-transitory, computer-readable storage media of claim 19, wherein the instructions, when executed by the one or more processors, further cause the computer system to receive user input for defining suppressing one or more differences in the generated reports for a specified amount of time; and wherein the provided generated reports exclude the suppressed one or more differences for the specified amount of time.

24. The one or more non-transitory, computer-readable storage media of claim 19, wherein:
the input data includes a plurality of input data instances received by the first system over time; and
the instructions, when executed by the one or more processors, further cause the computer system to:
access the input data from a data repository; and
cause the input data to be input to the second system in accordance with timing information that is based at least in part on timing of receipt of the input data instances by the first system.

* * * * *